(12) United States Patent
Isoda et al.

(10) Patent No.: US 9,776,924 B2
(45) Date of Patent: Oct. 3, 2017

(54) MULLITE SINTERED BODY, METHOD FOR PRODUCING THE SAME, AND COMPOSITE SUBSTRATE

(71) Applicant: NGK INSULATORS, LTD., Nagoya (JP)

(72) Inventors: Yoshinori Isoda, Ichinomiya (JP); Yosuke Sato, Hashima-Gun (JP); Yuji Katsuda, Tsushima (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 15/064,968

(22) Filed: Mar. 9, 2016

(65) Prior Publication Data

US 2016/0185668 A1 Jun. 30, 2016

Related U.S. Application Data

(63) Continuation of application No. PCT/JP2015/065006, filed on May 26, 2015.

(30) Foreign Application Priority Data

Jun. 6, 2014 (JP) .................................. 2014-117926
Mar. 17, 2015 (JP) .................................. 2015-053190

(51) Int. Cl.
*C04B 35/185* (2006.01)
*C04B 35/645* (2006.01)
(Continued)

(52) U.S. Cl.
CPC .......... *C04B 35/185* (2013.01); *C04B 35/645* (2013.01); *C04B 37/001* (2013.01);
(Continued)

(58) Field of Classification Search
CPC ......... C04B 35/185; H05K 1/03; H05K 1/036
See application file for complete search history.

(56) References Cited

U.S. PATENT DOCUMENTS

| 4,895,814 A | 1/1990 | Kanzaki et al. |
| 2006/0142401 A1* | 6/2006 | Tonkovich .............. B01B 1/005 518/726 |

(Continued)

FOREIGN PATENT DOCUMENTS

| JP | 60-161371 A1 | 8/1985 |
| JP | 62-046955 A1 | 2/1987 |

(Continued)

OTHER PUBLICATIONS

Korean Office Action (Application No. 10-2016-7006367) dated May 20, 2016 (with English translation).

(Continued)

*Primary Examiner* — Laura Auer
(74) *Attorney, Agent, or Firm* — Burr & Brown, PLLC

(57) ABSTRACT

A mullite sintered body according to the present invention has an impurity element content of 1% by mass or less and contains sintered mullite grains having an average grain size of 8 μm or less. When a surface of the mullite sintered body is finished by polishing, pores in the surface have an average largest pore length of 0.4 μm or less. The surface preferably has a center line average surface roughness (Ra) of 3 nm or less. The surface preferably has a maximum peak height (Rp) of 30 nm or less. The number of pores in the surface is preferably 10 or less per unit area of 4 μm×4 μm.

7 Claims, 2 Drawing Sheets

(51) Int. Cl.
*C04B 37/00* (2006.01)
*C04B 37/02* (2006.01)

(52) U.S. Cl.
CPC ............ *C04B 37/008* (2013.01); *C04B 37/02* (2013.01); *C04B 2235/5436* (2013.01); *C04B 2235/5445* (2013.01); *C04B 2235/6562* (2013.01); *C04B 2235/6565* (2013.01); *C04B 2235/6586* (2013.01); *C04B 2235/77* (2013.01); *C04B 2235/785* (2013.01); *C04B 2235/96* (2013.01); *C04B 2235/963* (2013.01); *C04B 2235/9646* (2013.01); *C04B 2235/9653* (2013.01); *C04B 2237/34* (2013.01); *C04B 2237/55* (2013.01); *C04B 2237/72* (2013.01)

(56) References Cited

U.S. PATENT DOCUMENTS

| | | | |
|---|---|---|---|
| 2006/0234021 A1 | 10/2006 | Tanei et al. | |
| 2014/0103353 A1* | 4/2014 | Ishibashi | H01L 21/2007 257/76 |

FOREIGN PATENT DOCUMENTS

| | | |
|---|---|---|
| JP | 62-056356 A1 | 3/1987 |
| JP | 62-091464 A1 | 4/1987 |
| JP | 63-089455 A1 | 4/1988 |
| JP | 03-247557 A1 | 11/1991 |
| JP | 04-175264 A1 | 6/1992 |
| JP | 06-100358 A1 | 4/1994 |
| JP | 06-227859 A1 | 8/1994 |
| JP | 2001-127362 A1 | 5/2001 |
| JP | 2013-155075 A1 | 8/2013 |
| JP | 5585570 B2 | 9/2014 |
| TW | 200520661 | 3/2005 |

OTHER PUBLICATIONS

International Search Report and Written Opinion (Application No. PCT/JP2015/065006) dated Sep. 1, 2015 (with English translation).
Taiwanese Office Action, Taiwanese Application No. 104117122, dated Jun. 14, 2016 (4 pages).
International Preliminary Report on Patentability (Application No. PCT/JP2015/065006) mailed Dec. 15, 2016.

* cited by examiner

MULLITE SINTERED BODY, METHOD FOR PRODUCING THE SAME, AND COMPOSITE SUBSTRATE

BACKGROUND OF THE INVENTION

1. Field of the invention

The present invention relates to a mullite sintered body, a method for producing the same, and a composite substrate.

2. Description of the Related Art

A mullite sintered body is a material superior in resistance to thermal shock, produced by sintering aluminum oxide ($Al_2O_3$) and silicon oxide ($SiO_2$) in a proportion of 3 to 2 and is expressed by $3Al_2O_3 \cdot 2SiO_2$. For example, PTL 1 discloses a mullite sintered body produced by compacting a powder prepared by mixing 30% by mass of yttria-stabilized zirconia (YSZ) powder to mullite powder, and sintering the compact. In PTL 1, the mullite sintered body is cut into a mullite substrate, and the main surface of the mullite substrate is polished for use as a base substrate to be bonded to a GaN substrate. It is believed that the thermal expansion coefficients of GaN and mullite are 6.0 ppm/K and 5.2 ppm/K, respectively, in a temperature range from room temperature to 1000° C. In view of bonding these substrates together for use, it is preferable to increase the thermal expansion coefficient of mullite so as to be close to the thermal expansion coefficient of the GaN substrate. For this sake, YSZ powder is mixed to mullite powder, and the mixture is sintered.

CITATION LIST

Patent Literature

PTL 1: Japanese Patent No. 5585570

SUMMARY OF THE INVENTION

Although PTL 1 discloses a mullite sintered body whose thermal expansion coefficient is increased by adding a considerably large amount of any other constituent to mullite, it does not mention any mullite sintered having a high mullite purity (highly pure mullite sintered body). Such highly pure mullite sintered body has not yet been known, much less that having a highly flat surface finished by polishing.

The present invention is intended to solve this issue, and a major object of the invention is to provide a highly pure mullite sintered body in which a surface thereof finished by polishing will have a high surface flatness.

A mullite sintered body according to the present invention has an impurity element content of 1% by mass or less, and in which the average grain size of the sintered mullite grains is 8 μm or less. Also, when a surface of the mullite sintered body is finished by polishing, pores in the surface have an average largest pore length of 0.4 μm or less. The surface finished by polishing of the mullite sintered body can have a high surface flatness.

A method for producing a mullite sintered body, according to the present invention includes compacting a mullite raw material powder with a purity of 99.0% by mass or more (substances to be released by heating are not considered impurities) into a predetermined shape, and then sintering the shape by hot press firing at a pressing pressure of 20 kgf/cm² to 300 kgf/cm² and a firing temperature of 1525° C. to 1700° C. This method can easily produce the mullite sintered body described above.

A composite substrate according to the present invention includes a support substrate defined by a mullite substrate made of the mullite sintered body described above, and a functional substrate made of one selected from the group consisting of lithium tantalate, lithium niobate, gallium nitride, and silicon. The support substrate and the functional substrate are bonded together. The bonding interface of the composite substrate exhibits good bondability because the percentage of the area involved in actual bonding (bonding area percentage) to the area of the bonding interface is large.

DETAILED DESCRIPTION OF THE INVENTION

Figure 1:
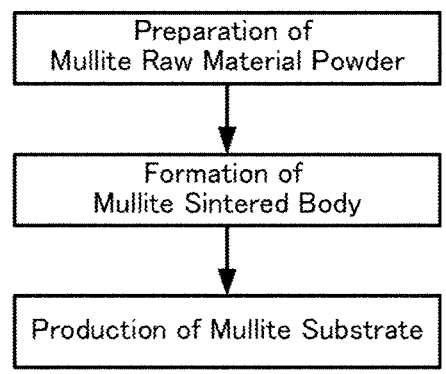
FIG. 1 is a production flow of a mullite substrate.

Although specific embodiments of the present invention will now be described, the invention is not limited to the following embodiments. It should be understood that various modifications and improvements may be made as required within the spirit of the invention, based on the ordinary knowledge of those skilled in the art.

The mullite sintered body according to the present invention has an impurity element content of 1% by mass or less, and in which the average grain size of the sintered mullite grains is 8 μm or less (preferably 5 μm or less). Also, when a surface of the mullite sintered body is finished by polishing, pores in the surface have longest portions having an average length of 0.4 μm or less (preferably 0.3 μm or less). In the present invention, impurity elements refer to elements other than Al, Si, and O, and the content of impurity elements is determined by high-frequency inductively coupled plasma emission spectrometry. The average grain size of the sintered mullite grains is determined by chemically etching with phosphoric acid the surface mirror-finished by polishing of the mullite sintered body, measuring the grain sizes of 200 or more sintered mullite grains in the surface through an SEM, and calculating the average of the grain sizes by a segment method. Also, the average length of the longest portions of the pores is determined by observing a surface finished in the same manner through AFM, calculating the average length of the longest portions, and converting the average length to a value per unit area (area of a square of 1 μm on each side). Sintered mullite grains having an average grain size of larger than 8 μm are undesirable. Such sintered grains are different in ease of being polished, and this is likely to cause height differences among the grains. Also, if the average grain size of the longest portions of the pores exceeds 0.4 μm, the area of the pores and around the pores, which causes bonding failure, increases excessively and this is undesirable. Since the mullite sintered body of the present invention contains very little heterophase components other than mullite components, the mirror-finished surface thereof can have a high surface flatness. The surface flatness can be evaluated by, for example, estimating the center line average surface roughness Ra or the maximum peak height Rp of the mirror-finished surface, or the number of pores in the surface. In this connection, a large amount of heterophase components results in insufficient surface flatness because ease of polishing is different between the mullite phase and the heterophase components. In particular, heterophase components are difficult to polish and are likely to remain in a protruding manner, thus hindering the increase in surface flatness.

Preferably, the mullite sintered body of the present invention has a center line average surface roughness Ra of 3 nm or less, more preferably 2.5 nm or less. Also, the maximum peak height Rp is preferably 30 nm or less and more preferably 25 nm or less. The number of pores in the surface is preferably 10 or less, more preferably 7 or less, per unit area of 4 µm×4 µm. The center line average surface roughness Ra and maximum peak height Rp used in the present invention are values obtained by measuring a surface mirror-finished by polishing with a three dimensional optical profiler. The area of measurement is 100 µm×140 µm. The center line average surface roughness Ra and the maximum peak height Rp, mentioned herein correspond to the arithmetic average roughness Ra and the maximum peak height Rp of a roughness profile, respectively, each specified in JIS B 0601: 2013.

Preferably, the mullite sintered body of the present invention has a 4-point flexural strength of 280 MPa or more, more preferably 300 MPa or more. Such a mullite sintered body is so strong that it cannot be easily deformed when used. The 4-point flexural strength mentioned herein refers to a value obtained by measurement in accordance with JIS R 1601.

Preferably, the content of impurity elements in the mullite sintered body of the present invention is 0.5% by mass or less, and more preferably 0.1% by mass or less. Such a mullite sintered body contains a further reduced amount of heterophase components, which are difficult to polish and likely to remain in a protruding manner. Accordingly, the surface flatness is further increased.

When the mullite sintered body of the present invention is formed into a plate having a thickness of 0.1 mm, the plate preferably has a total light transmittance of 20% or more to light having a wavelength of 550 nm. This total light transmittance is a value obtained by measuring the total light transmittance of a test piece of the mullite sintered body having a predetermined thickness to lights having wavelengths of 200 nm to 3000 nm, and estimating the total light transmittance of the test piece to light having a wavelength of 550 nm, and calculating the value for a thickness of 0.1 mm. Such a mullite sintered body allows easy observation of the bonding state of the mullite substrate. For example, when the mullite sintered body is processed into a mullite substrate and bonded to a non-light-transmissive substrate, such as a Si substrate, the bonding state can be checked by observing the bonded structure through the mullite substrate visually or through a microscope.

In the method of the present invention for producing a mullite sintered body, a mullite sintered body is produced by compacting a mullite raw material powder with a purity of 99.0% by mass or more (substances to be released by heating are not considered impurities) into a predetermined shape, and then sintering the shape by hot press firing at a pressing pressure of 20 kgf/cm² to 300 kgf/cm² and a firing temperature (the highest temperature during firing) of 1525° C. to 1700° C.

An exemplary process for producing a mullite substrate will now be described with reference to the process flow shown in FIG. 1.

(Preparation of Mullite Raw Material Powder)

Although any commercially available mullite powder can be used as the mullite raw material powder, a highly pure powder having a small average particle size is preferred. For example, the purity of the mullite power is preferably 99.0% or more, more preferably 99.5% or more, and still more preferably 99.8% or more. The purity is represented on a percent-by-mass basis. Also, the average particles size (D50) is preferably 3 µm or less, more preferably 2 µm or less, and still more preferably 1 µm or less. The average particle size (D50) is measured by laser diffraction. With such a highly pure and fine raw material, mullite can be densified at low temperature by not press firing, and it is possible to prevent impurities from forming heterogeneous phases or abnormally growing into grains, thus resulting in a sintered body containing fine, homogeneous sintered mullite grains.

Alternatively, mullite coarse grains may first be prepared by firing a mixed powder containing highly pure $Al_2O_3$ and $SiO_2$, with a predetermined proportion. Then, the coarse grains are pulverized into a mullite raw material powder. In this case as well, in order to reduce impurities, it is preferable to use highly pure $Al_2O_3$ and $SiO_2$ and to use an alumina medium (balls and container) for pulverizing the coarse grains. A highly wear-resistant zirconia medium may be used. In this instance, however, it must take care to minimize contamination of the raw material powder with zirconia by reducing the pulverization time. Metallic media are not suitable because they can wear and thus increase the amount of impurities in the mullite raw material. Substances to be released by heating, such as $CO_2$ and $H_2O$, need not be taken into account as the impurities in the raw material powder. Precursors that will produce $Al_2O_3$ and $SiO_2$ by heating may be used in the mixed powder for preparing a mullite composition.

(Formation of Mullite Sintered Body)

Then, the mullite raw material powder as described above is compacted into a predetermined shape, and the compact is sintered into a dense mullite sintered body by hot pressing. For the compacting, any known technique may be used, such as press forming using a die, cold isostatic press (CIP), extrusion of a clay of the raw material powder, or casting or tape forming of slurry. In this instance, it is desirable to remove organic components from the binder or the like to be added as an aid for compacting to the raw material powder, the clay, or the slurry by beating before firing. Thus, the impurity content in the resulting mullite substrate can be reduced.

The resulting compact of the mullite raw material powder is sintered into a dense mullite sintered body by heating and firing. In this operation, from the viewpoint of producing a mullite substrate having a high surface flatness, it is important to remove pores during sintering with the sintered grains kept fine. For this sake, firing by hot pressing is particularly advantageous. Hot pressing is performed by firing a compact placed in a graphite mold while the compact is being pressed between punching rods and dies. Thus mullite grains are densified while being kept fine, at a lower temperature than that in general normal-pressure sintering. This method can minimize preventing the formation of remaining large pores that are often formed by normal pressure sintering and coarse mullite grains that are formed by growth of mullite grains. The firing temperature of the hot pressing is preferably 1525° C. to 1700° C., and more preferably 1550° C. to 1650° C. Also, the pressing pressure for the hot pressing is preferably 20 kgf/cm² to 300 kgf/cm². The holding time of the firing temperature (maximum temperature), which may be set according to the shape and dimensions of the compact and the features of the heating furnace, is preferably, for example, 1 to 12 hours, and more preferably 2 to 8 hours. The atmosphere for the hot press firing can be of an inert gas, such as nitrogen or argon, or vacuum.

(Production of Mullite Substrate)

A mullite substrate is produced from the mullite sintered body formed as above. For this operation, first, the periphery of the sintered body is processed into a predetermined shape, and then the resulting body is sliced into a thin plate, thus being cut out into a mullite substrate. Subsequently, both sides of the resulting mullite substrate are planarized by diamond lapping, CMP polishing, or the like. Then, the mullite substrate is washed with a conventional cleaning solution, such as an amine solution, SPM (sulfuric acid/ hydrogen peroxide mixture), or RCA cleaning solution, to remove metallic or organic contaminants, particles, and the like from the surface of the substrate. Thus the mullite substrate has a clean surface satisfying requirements for producing a composite substrate.

Figure 2:
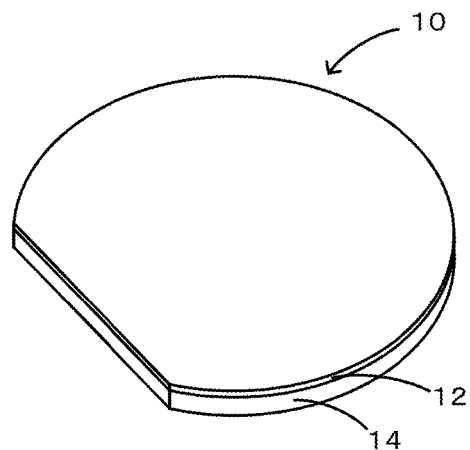
FIG. 2 is a perspective view of a composite substrate 10.

The composite substrate of the present invention includes a support substrate and a functional substrate that are bonded together. The support substrate is a mullite substrate made of the above-described mullite sintered body. The functional substrate may be, but is not limited to, a piezoelectric substrate, such as a lithium tantalate (LT) substrate or a lithium niobate (LN) substrate, or a semiconductor substrate, such as a gallium nitride (GaN) substrate or a silicon (Si) substrate. The two substrates may be bonded together directly or with an adhesion layer therebetween. Preferably, they are directly bonded. For being directly bonded, the bonding surfaces of the functional substrate and the mullite support substrate are activated, and then they are opposed to each other and pressed against each other. The activation of the bonding surfaces is performed by, for example, irradiating the bonding surfaces with an ion beam of an inert gas (such as argon), or with a plasma or a neutral atomic beam. For bonding with an adhesion layer, the adhesion layer may be formed of, for example, an epoxy resin or an acrylic resin. FIG. 2 shows an exemplary composite substrate. The composite substrate 10 is a substrate produced by directly bonding a piezoelectric substrate 12 that is a functional substrate and a support substrate 14 together.

In the composite substrate of the present invention, since the support substrate is the above-described mullite substrate, the surface flatness of the support substrate is high. Therefore the percentage of the area involved in actual bonding (bonding area percentage) to the area of the bonding interface can be large (for example, 80% or more). Since the composite substrate produced as above exhibits good bondability, the functional substrate and the mullite support substrate can be polished to a small thickness as required.

Figure 3:
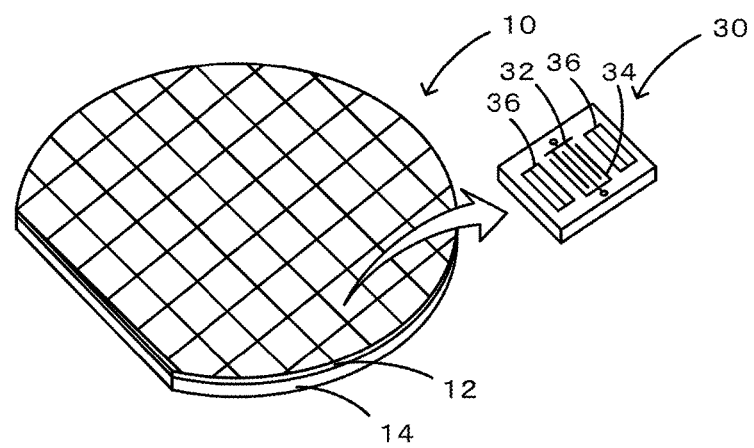
FIG. 3 is a perspective view of an electronic device 30 produced with the composite substrate 10.

The composite substrate of the present invention includes the mullite substrate superior in mechanical properties as the support substrate and, accordingly, can respond to demands for miniaturized or low-profile electronic devices. Such electronic devices include acoustic wave devices (such as surface acoustic wave devices, lamb wave elements, and film bulk acoustic resonators (FEAR)), LED devices, optical waveguide devices, switching devices, and semiconductor devices, if the above-described composite substrate is used in an acoustic device, the expansion and contraction of the acoustic device due to temperature change can be reduced because the mullite substrate acting as the support substrate has a low thermal expansion coefficient of about 4.4 ppm/K (40° C. to 400° C.) and a high Young's modulus of 220 GPa or more. Consequently, the temperature dependence of frequency of the device can be much reduced. In addition, since the mullite substrate contains fine grains and has few pores or other defects and is thus dense, it has a high strength of 280 MPa or more and can serve as reliable support substrate. FIG. 3 shows an exemplary electronic device 30 produced with the composite substrate 10. The electronic device 30 is a 1-port SAW resonator, that is, a surface acoustic wave device. First, a pattern of a large number of electronic devices 30 is formed in the piezoelectric substrate 12 of the composite substrate 10 by a conventional photolithography, and then the electronic devices 30 are cut out by dicing. The electronic device 30 is produced by forming IDT (Interdigital Transducer) electrodes 32 and 34 and reflection electrodes 36 on the surface of the piezoelectric substrate 12.

In comparison of the mullite substrate with a silicon substrate, the mullite substrate has a thermal expansion coefficient substantially equal to that of the silicon substrate and a higher strength and a higher Young's modulus. The mullite substrate is therefore not easily bent or broken and is thus advantageous. In addition, the mullite substrate exhibits much higher electric insulation than silicon or high-resistivity silicon, accordingly being used as an insulating support substrate. In the case of being used as a support substrate for a GaN substrate as well, the mullite substrate enables low-cost manufacturing because it is superior in mechanical properties and highly reliable. The composite substrate including a mullite support substrate has a thermal expansion coefficient close to that of silicon and GaN, and is therefore easy to apply to known manufacturing processes using silicon or GaN.

EXAMPLE

Examples of the present invention will now be described in detail. However, the invention is not limited to the examples below.

1. Preparation of Mullite Raw Material Powder

A commercially available mullite powder having a purity of 99.9% or more and an average particle size of 0.7 µm was used as mullite raw Material powder A. For mullite raw material powder B, commercially available alumina and silica powders, each having an average particle size of 1 µm or less and a purity of 99.9% or more are used as the starting materials. These starting materials were wet-mixed with an alumina medium, followed by drying. The dried mixed raw material was heated to synthesize mullite. After being wet-pulverized with an alumina medium and dried, the mullite was used as mullite raw material powder B. The mullite raw material powder B had a purity of 99.9% or more and an average particle size D50 of 0.9 µm. A powder having a purity of 99.0% and an average particle size of 2.2 µm was used as raw material powder C. A powder having a purity of 98.5% and an average particle size of 3.6 µm was used as raw material powder D. The major impurities contained in raw material powders C and D include Fe, Ti, Ca, and Na. The purities above are represented by the content of the constituent elements Si, Al, and O of mullite on a percent-by-mass basis, and elements other than these three elements are impurities.

2. Formation of Mullite Sintered Body

Each of the above-prepared mullite raw material powders was placed in a die of about 125 mm in diameter and pressed into a disk having a thickness of about 10 mm to 15 mm at a pressure of 200 kgf/cm$^2$, thus forming a mullite compact. Subsequently, the mullite compact was placed in a graphite hot press mold having an inner diameter of about 125 mm and fired in a hot press furnace to yield a mullite sintered body having a diameter of about 125 mm and a thickness of about 5 mm to 8 mm. The maximum temperature during firing (firing temperature) was 1500° C. to 1750° C., and the holding time of the firing temperature was 5 hours. The heating rate and the cooling rate were each 200° C./h. The press load during heating was 200 kgf/cm² at 900° C. or more. The furnace atmosphere was vacuum before reaching 900° C. After reaching 900° C., Ar was introduced and sintering was performed in an Ar atmosphere. The compact was held at a firing temperature for a predetermined time and then cooled to 1200° C. Then, the controls of press load and atmosphere were stopped, and the compact was naturally cooled.

3. Evaluations of Properties

Transverse rupture rods or the like of 4 mm×3 mm×40 mm were cut out from the resulting sintered body for evaluations. For the evaluation of the surface properties of the sintered body, a surface of a test piece of about 4 mm×3 mm×10 mm was mirror-finished by polishing. The polishing was performed using 3 μm diamond abrasive grains and 0.5 μm diamond abrasive grains in that order. For final finishing, buffing was performed with colloidal silica slurry (pH=11, particle size: 80 nm) and a non-woven fabric pad.

(1) Bulk Density, Porosity

These properties were measured by Archimedean method using distilled water.

(2) Average Grain Size of Sintered Mullite Grains

The mirror-finished surface was chemically etched with phosphoric acid. Then, the sizes of 200 or more sintered mullite grains in the surface were measured by SEM, and the average grain size was calculated by a segment method. The number of counts of the segment method was 1.5, and the grain size of each sintered grain was determined by multiplying the length measured by SEM and 1.5.

(3) Number of pores, Average Largest Pore Length

The mirror-finished surface was observed by AFM. The number of pores having a largest length of 0.1 μm or more was defined as the number of pores, and the average length of the longest portions of the pores was defined as the average largest pore length. Each unit area is represented as 4 μm by 4 μm square (area of a square of 4 μm on each side).

(4) Surface Flatness

The center line average surface roughness Ra and the maximum peak height Rp of the mirror-finished surface were measured with a three-dimensional optical profiler Zygo. These values were evaluated as surface flatness. The measurement area was 100 μm×140 ηm.

(5) Flexural Strength

The 4-point flexural strength was measured at room temperature in accordance with JIS R 1601.

(6) Composition Analysis (Amount of Impurities)

The amounts of $Al_2O_3$, $SiO_2$, and impurities in the raw material powder and the pulverized sintered body were measured by high-frequency inductively coupled plasma emission spectroscopy.

(7) Optical Property (Total Light Transmittance)

The total light transmittances of each test piece having a thickness of 0.3 mm to 0.5 mm to lights having wavelengths of 200 nm to 3000 nm were measured, and the total light transmittance to light having a wavelength of 550 nm was used as the representative value for calculation for the value for a thickness of 0.1 mm. For this measurement, a spectrophotometer was used. A bundle of substantially parallel light rays was impinged on the surface of the sample in a direction normal to the surface for measuring the total light transmittance of the sample. Air in the optical path to which the sample was not introduced was used as the reference material. The spectral transmittance of the reference material was defined as 1, and the total light transmittance of the sample was obtained by dividing the transmitted light with an integrating sphere.

(8) Crystal Phase

The crystal phase of the pulverized sintered body was identified with an XRD apparatus. The XRD apparatus was Rotating Anticathode PINT manufactured by Rigaku, and the measurement was performed under the conditions of CuKα, 50 kV, 300 mA, and 2θ=5–70°.

4. Production of Mullite Substrate

The resulting mullite sintered body was processed so as to be cut into discus substrates having a diameter of about 100 mm and a thickness of about 600 μm. After both surfaces of each substrate were finished by CMP, the substrates were cleaned to remove particles and contaminant from the surfaces, and thus mullite substrates were produced. Subsequently, each of the resulting mullite substrates was directly bonded as the support substrate to any of the functional substrates: a LT substrate, a LN substrate, and a Si substrate. More specifically, the bonding surfaces of the functional substrates and the mullite support substrates were activated with an argon ion beam, and then the bonding surfaces of each combination of the substrates was opposed to each other and bonded together by pressing at 10 tonf.

Experimental Examples 1 to 6

In Experimental Examples 1 to 6, mullite sintered bodies were produced from raw material powder A at a firing temperature of 1500° C. to 1750° C., as shown in Table 1, and substrates were produced from the resulting mullite sintered bodies. Table 1 shows the properties of the mullite sintered bodies and substrates thereof.

TABLE 1

| | Firing Condition | | Mullite Sintered Body | | | | | | | | | Mullite Substrate |
| | | | | | | | Flatness of Polished Surface (nm) | | | *2 Impurity | Total Light | *3 |
| Experimental Example | Raw Material Powder | The Highest Temperature (° C.) | Bulk Density (g/cm³) | Porosity (%) | Mullite Sintered Grain Size (μm) | Average Largest Pore Length (μm) | *1 The Number of Pores (number) | Ra | Rp | Flexural Strength (MPa) | Element Content (% by mass) | Trans-mittance (%) | Bond-ability |
| 1 | A | 1500 | 2.84 | 8.7 | 1.5 | 1.2 | >100 | — | — | 176 | <0.1 | <1 | x |
| 2 | A | 1550 | 3.15 | <0.003 | 2 | 0.4 | 7 | 1.5 | 19 | 302 | <0.1 | 22 | o(LT) |
| 3 | A | 1600 | 3.15 | <0.003 | 3 | 0.2 | 6 | 1.8 | 20 | 332 | <0.1 | 27 | o(LT) |
| 4 | A | 1650 | 3.15 | <0.003 | 5 | 0.3 | 5 | 2.3 | 22 | 325 | <0.1 | 32 | o(LT) |
| 5 | A | 1700 | 3.15 | <0.003 | 7 | 0.4 | 3 | 2.9 | 28 | 288 | <0.1 | 38 | o(LT) |
| 6 | A | 1750 | 3.15 | <0.003 | 10 | 0.5 | 2 | 5.6 | 46 | 253 | <0.1 | 43 | x(LT) |
| 7 | B | 1600 | 3.15 | <0.003 | 3 | 0.2 | 5 | 1.6 | 18 | 335 | <0.1 | 29 | o(LT) |
| 8 | | | | | | | | | | | | | o(LN) |
| 9 | | | | | | | | | | | | | o(Si) |

TABLE 1-continued

| | Firing Condition | | | | Mullite Sintered Body | | | | | | | | |
|---|---|---|---|---|---|---|---|---|---|---|---|---|---|
| | | | | | Mullite Sintered Grain Size | Average Largest Pore Length | *1 The Number of Pores | Flatness of Polished Surface (nm) | | Flexural Strength | *2 Impurity Element Content | Total Light Trans-mittance | Mullite Substrate *3 Bond- |
| Experimental Example | Raw Material Powder | The Highest Temperature (° C.) | Bulk Density (g/cm³) | Porosity (%) | (μm) | (μm) | (number) | Ra | Rp | (MPa) | (% by mass) | (%) | ability |
| 10 | C | 1600 | 3.14 | 0.05 | 7 | 0.6 | 13 | 5.1 | 52 | 245 | 0.8 | <10 | x |
| 11 | D | 1600 | 3.14 | 0.08 | 9 | 0.6 | 16 | 5.4 | 95 | 210 | 1.2 | <10 | x |

*1: The number of pores herein refer to the one per unit area of 4 μmm × 4 μmm square.
*2: Impurity elements herein refer to elements other than Al, Si, arid O.
*3: The bondability herein refer to the one when a mullite substrate and a functional substrate (see in parentheses) are bonded. "∘" represents excellent, and "x" represents failure.

In Experimental Example 1, the firing temperature was set at 1500° C., and the sintered body had as a low bulk density as 2.84 g/cm³ and as a high porosity as 8.7%, thus exhibiting lack of densification. A large number of pores of 1 μm to 2 μm were viewed in a broken surface of the sintered body. Thus the substrate was in a state in which it was not able to be used as a support substrate to be bonded (100 pores in a 100 μm by 100 μm square). The result of crystal phase analysis of the sintered body showed a very small amount of heterogeneous phases that were probably cristobalite or corundum.

In Experimental Example 2, the firing temperature was set at 1550° C. The sintered body had a bulk density of 3.15 g/cm³ and a porosity of 0.1% or less. It was thus confirmed that the polished surface was mirror-finished. The observation of the polished surface showed that remaining pores were very small and the number thereof was also small, and that the substrate had been sufficiently densified with a mullite sintered grain size as very small as 2 μm. XRD showed that there was no phases except the mullite phase. The number of pores in the polished surface observed by AFM was small as 7 per unit area of a 4 μm by 4 μm square; Ra and Rp were 1.5 nm and 19 nm, respectively, thus small. Thus the resulting mullite substrate was highly flat. This substrate and a LT substrate were directly bonded together. The percentage of the area involved in actual bonding (bonding area percentage) to the area of the bonding interface was about 100%, thus showing an excellent bonding state.

In Experimental Examples 3, 4 and 5, the firing temperatures were set at 1600° C., 1650° C., and 1700° C., respectively. Each sample exhibited a high bulk density and a low porosity, having been sufficiently densified as in Experimental Example 2. Although the number of pores, Ra, and Rp in the polished surface were each good, there were shown tendencies for the porosity to decrease and for the Ra and Rp to increase, with increasing firing temperature. This reason is probably as below. As the firing temperature is increased, the growth of mullite grains proceeds to reduce the number of pores. On the other hand, the mullite grains having increased grain sizes are likely to have different heights from each other and thus form an uneven surface when the surface of the substrate is mirror-finished. In view of this, the firing temperature is desirably up to 1700° C. The sintered bodies of Experimental Examples 3, 4 and 5 contain no heterophases except the mullite phase. The mullite substrates of Experimental Examples 3, 4 and 5 were each excellently directly bound to a LT substrate, as well as that of Example 2, and the bonding area percentage was 90% to 100%.

In Experimental Example 6, the firing temperature was set at 1750° C. Since the firing temperature was higher than that in the Experimental Examples up to Experimental Example 5, the growth of mullite grains proceeded to a. sintered grain size of 10 μm, and the number of large pores is increased. As a result, the surface finished by polishing had Ra of 5.6 nm and Rp of 46 nM, exhibiting a poor surface flatness. The mullite substrate of Experimental Example 6 was subjected to bonding in the same manner as in Experimental Example 2. However, the bonding area percentage did not reach 40%, and was not used for producing a composite substrate.

For the flexural strengths of the mullite sintered bodies of Experimental Examples 1 to 6, Experimental Example 1, in which densification was insufficient, exhibited a low flexural strength of 130 MPa, while Experimental Examples 2 to 6, in which densification was satisfactory, exhibited high flexural strengths of 250 MPa or more. In particular, Experimental Examples 2 to 5 exhibited as high strengths as more than 280 MPa. This suggests that composite substrates using any one of these mullite substrates as the support substrate can be strong mechanically and stable to repeated load of heat or the like, and thus can be reliable, in this point of view, it can be said that the mullite substrates of Experimental Examples 2 to 4, which had a strength of 300 MPa or more, are More advantageous.

Experimental Example 7 to 9

A mullite sintered body was produced from raw material powder B by hot press firing performed in the same manner as in Experimental Example 3. The sintered body had been satisfactorily densified with a bulk density as high as 3.15 g/cm³, and a porosity as low as less than 0.03%. The sintered grain size, the pore length, the number of pores, and Ra and Rp in the polished surface were each as small as those in Example 3 and were thus good. No crystal phase except mullite phases was detected. Three mullite substrates were cut out of this mullite sintered body. A first mullite substrate was directly bonded to a LT substrate (Experimental Example 7); a second mullite substrate was directly bonded to a LN substrate (Experimental Example 8); and a third mullite substrate was directly bonded to a Si substrate. As a result, the bonding area percentage of each sample was substantially 100%, thus showing an excellent bonding state.

Experimental Examples 10 and 11

In Experimental Examples 10 and 11, mullite sintered bodies were produced from raw material powders C and D, respectively, by hot press firing performed in the same manner as in Experimental Example 3. Although these mullite sintered bodies was highly densified with high bulk densities, the porosities were rather high. This suggests that these sintered bodies were in a state where pores were confined therein. The average grain size of sintered mullite grains was larger than that of Experimental Example 3. This suggests that any impurity element contained in the raw material might have promoted the growth of the grains during sintering. The surface finished by polishing had a large Ra and Rp and exhibited that grain growth had progressed. Also, small peaks derived from a substance other than mullite appeared in analysis of crystal phases. These results suggests that impurity elements form heterophase portions in a protruding manner in the polished surface. These samples were judged to be unsuitable as the support substrate of the composite substrate.

The mullite sintered bodies of Experimental Examples 2 to 9 were evenly densified with high purity and high density, consequently exhibiting high total light transmittance of more than 20%. If these mullite sintered bodies are bonded to a non-light-transmissive substrate, such as a Si substrate, defective bonding portions such as bubble portions can be detected by observing the bonded structure through the mullite substrate visually or with a microscope.

Experimental Examples 2 to 5 and 7 to 9 of the Experimental Examples 1 to 11 correspond to Examples of the present invention, and Examples 1, 6, 10 and 11 correspond to Comparative Examples.

The present application claims priority from Japanese Patent Application No. 2014-117926, filed on Jun. 6, 2014, and Japanese Patent Application No. 2015-53190, filed on Mar. 17, 2015, the entire contents of which are incorporated herein by reference.

Needless to say, the above examples do not limit the present invention in any way.

What is claimed is:

1. A composite substrate comprising:
   a support substrate; and
   a functional substrate bonded to the support substrate,
   wherein the support substrate is a mullite sintered body having an impurity element content of 1% by mass or less, the mullite sintered body containing sintered mullite grains having an average grain size of 8 μm or less, wherein pores present in a polished surface thereof have an average largest pore length of 0.4 μm or less, the mullite sintered body has a porosity of less than 0.03%, and the maximum peak height (Rp) of the surface of the mullite sintered body is 30 nm or less, and
   wherein when the mullite sintered body is formed into a plate having a thickness of 0.1 mm, the plate has a total light transmittance of 20% or more to light having a wavelength of 550 nm.

2. The composite substrate according to claim 1, wherein the surface of the mullite sintered body has a center line average surface roughness (Ra) of 3 nm or less.

3. The composite substrate according to claim 1, wherein the number of pores in the surface of the mullite sintered body is 10 or less per unit area of 4 μm×4 μm.

4. The composite substrate according to claim 1, wherein the mullite sintered body has a 4-point flexural strength of 280 MPa or more.

5. The composite substrate according to claim 1, wherein the impurity element content of the mullite sintered body is 0.5% by mass or less.

6. The composite substrate according to claim 1, wherein the functional substrate is directly bonded to the support substrate.

7. The composite substrate according to claim 1, wherein the mullite sintered body has a bulk density of 3.15 g/cm$^3$.

* * * * *